United States Patent

[11] 3,549,875

| [72] | Inventor | David A. Goldman<br>Westchester County, N.Y. (Croton Heights Road, Box 69, RFD 1, Yorktown Heights, N.Y. 10598) |
|---|---|---|
| [21] | Appl. No. | 756,002 |
| [22] | Filed | Aug. 28, 1968 |
| [45] | Patented | Dec. 22, 1970 |

[54] BILATERAL MOMENT PROBABILITY COMPUTER
7 Claims, 3 Drawing Figs.

| [52] | U.S. Cl. | 235/193,<br>235/151.13 |
|---|---|---|
| [51] | Int. Cl. | G06g 7/48 |
| [50] | Field of Search | 235/151.1,<br>151.11, 151.12, 151.13, 151.2, 151.2, 151.3,<br>151.31, 151.32, 151.33, 151.34, 151.35, 150.1,<br>193, 184, 183 |

[56] References Cited

UNITED STATES PATENTS

| 2,965,300 | 12/1960 | Radley et al. | 235/193 |
| 3,082,949 | 3/1963 | Barker | 235/193X |
| 3,146,344 | 8/1964 | Palmer | 235/151.13 |
| 3,147,370 | 9/1964 | Lowman | 235/151.13 |
| 3,339,063 | 8/1967 | Norsworthy | 235/193X |

*Primary Examiner*—Malcolm A. Morrison
*Assistant Examiner*—Joseph F. Ruggiero
*Attorney*—Watson, Leavenworth & Kelton

ABSTRACT: A computer for determining a bound to the probability of a random variable equaling or exceeding the difference between a prescribed limit value and the variable average value, based upon the second bilateral moment of the variable about the average value. The computer includes circuitry for averaging the variable, circuitry for determining the second bilateral moment of the variable about its average value, circuitry for detecting the absolute difference between the variable average value and the limit value and circuitry for determining the ratio of the bilateral moment to the squared difference signal. The computer is illustrated in system applications involving air pollution monitoring and control and manufacturing process control.

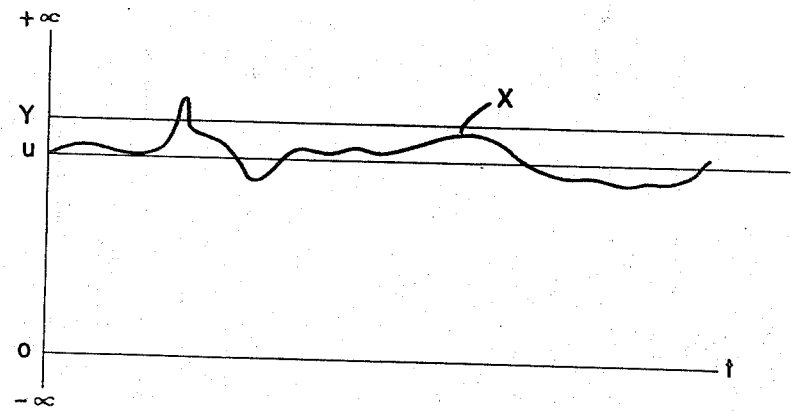
FIG. I
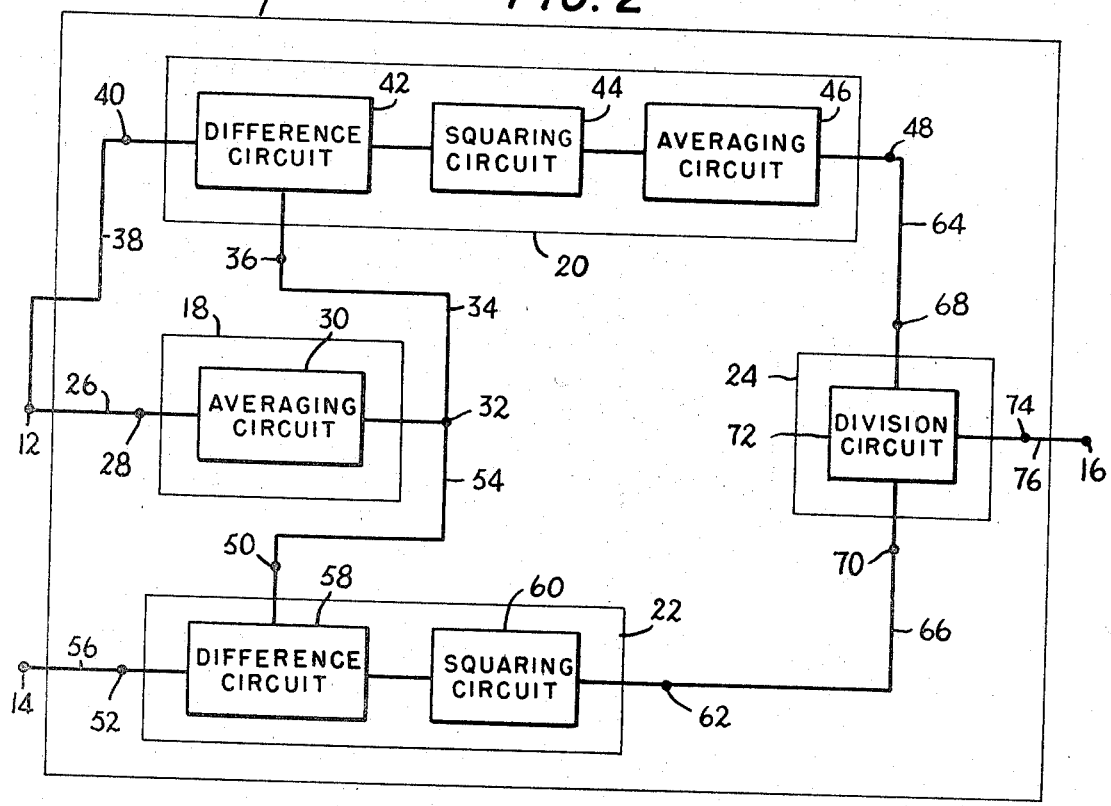
FIG. 2
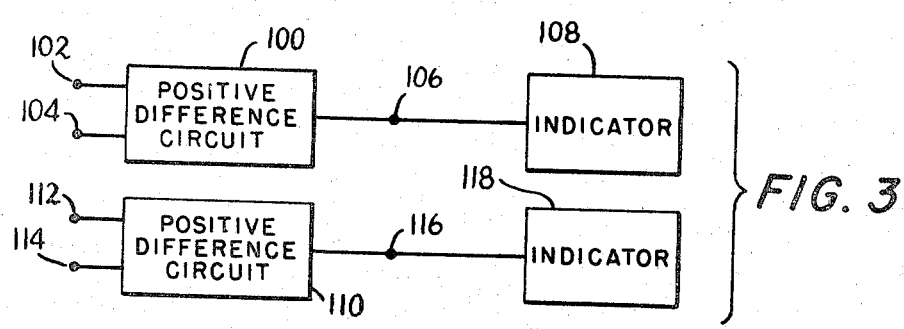
FIG. 3

BILATERAL MOMENT PROBABILITY COMPUTER

BACKGROUND OF THE INVENTION

This invention relates to apparatus for performing probability analysis of a random variable. In particular the invention relates to a probability computer adapted to determine a bound to the probability of the deviation of a random variable from its average value equaling or exceeding the difference between a prescribed limit value and the variable average value.

In known methods of probability computation the second bilateral moment or variance is generally of significant interest, the square root of this moment being known as the standard deviation. In computing the second moment, the instantaneous variable values above and below the expectation or mean value of the variable are raised to the second power and a summation is made.

The use of the bilateral second moment to determine the bounds to the probability of a variable equaling or exceeding the deviation between a prescribed limit value and the expectation has been disclosed in what is known as Chebyshev's inequality. This mathematical inequality provides the probability information as a function of the standard deviation of the variable.

SUMMARY OF THE INVENTION

In the present invention, there is provided a probability computer, based on Chebyshev's inequality, which permits ready determination of probability information based on input signals comprising the variable of interest and the limit value prescribed for the variable.

The computer of the invention comprises circuitry for averaging the variable signal, circuitry responsive to the variable signal and the averaged signal for determining the second bilateral moment of the variable about its expectation, difference circuitry responsive to the limit value signal and the averaged signal for detecting the difference therebetween and squaring same, and circuitry responsive to input signals comprising the determined bilateral moment and the squared difference signal for computing the ratio of these signals, this ratio constituting the bound to the probability determination.

The probability computer of the invention is shown herein in systems applications, including air pollution monitoring and control and manufacturing process control. Such systems, which normally involve only direct monitoring of the variable itself, are enhanced considerably by the probability information provided by the computer of the invention.

It is a primary object of the invention to provide a probability computer which yields a bound to the probability of a variable exceeding, equaling or falling below prescribed limit values.

It is another object of this invention to provide a probability computer in which cognizance is taken of the second bilateral moment of a random variable about its expectation.

It is a further object of this invention to provide a system for indicating the approach of excess atmospheric pollution levels.

It is an additional object of this invention to provide a system for enabling the operation of manufacturing and process control systems at the permissible outer limits of operation.

These and other objects of the invention will become evident from a consideration of the following detailed description of a preferred embodiment of the invention and the drawings thereof.

BRIEF DESCRIPTION OF THE DRAWINGS

FIG. 1 is a plot of a real time random variable and a limit imposed thereon in probability computation.

FIG. 2 is a block diagram of the computer of the invention.

In FIG. 3, there is shown circuitry adapted to cooperate with the probability computer of FIG. 2 to permit use of the computer as a control device.

DESCRIPTION OF THE PREFERRED EMBODIMENT

An understanding of the probability computer of the invention will be enhanced by a preliminary consideration of the following development of a form of Chebyshve's inequality.

In FIG. 1 a real time variable X is shown as having an expectation or average value $u$. The variance V or second bilateral moment of the variable about the expectation is defined as follows:

$$V(x) = \int_{-\infty}^{+\infty} (x-u)^2 f_x(x) dx \qquad (1)$$

where $f_x(x)$ is the probability density function of the random variable $X$.

Dividing the integral into three parts:

$$V(x) = \int_{-\infty}^{u-r} (x-u)^2 f_x(x) dx = \int_{u-r}^{u+r} (x-u)^2 f_x(x) dx + \int_{u+r}^{+\infty} (x-u)^2 f_x(x) dx \qquad (2)$$

where $r$ is a positive number.

Between the limits of $-\infty$ to $u-r$ and $u+r$ to $+\infty$, $(x-u)^2 \geq r^2$. Thus, $$V(x) \geq r^2 \int_{-\infty}^{u-r} f_x(x) dx + r^2 \int_{u+r}^{\infty} f_x(x) dx \qquad (3)$$

By definition, the probability of $X$ equalling or exceeding $u+r$ is $$P[X \geq u+r] = \int_{u+r}^{\infty} f_x(x) dx \qquad (4)$$

and the probability of $X$ equalling or falling below $u-r$ is $$P[X \leq u-r] = \int_{-\infty}^{u-r} f_x(x) dx \qquad (5)$$

Substituting (4) and (5) in (3), $$V(x) \geq r^2 P[X \leq u-r] + r^2 P[X \geq u+r] \qquad (6)$$

or $$V(x) \geq r^2 P[|X-u| \geq r] \qquad (7)$$

or $$P[|X-u| \geq r] \leq \frac{V(x)}{r^2} \qquad (8)$$

Letting $r = |Y-u|$, (8) may be written $$P[|X-u| \geq |Y-u|] \leq \frac{V(x)}{|Y-u|^2} = P' \qquad (9)$$

Literally stated, the probability $P'$ that the deviation of a random variable X from its expectation $u$ will equal or exceed the difference between a prescribed limit value Y and the variable expectation is less than or equal to the ratio of the second bilateral moment of the variable about its expectation to the squared difference between the limit value and the expectation of the variable.

Expression (9) is implemented in computer 10 of FIG. 2. At input terminals 12 and 14, the computer receives input signals representing respectively the random variable X and a prescribed limit value Y. At output terminal 16 the computer provides the probability determination P'.

The computer is functionally divisible into several separate computing elements. Element 18 is adapted to determine the expectation $u$ of the random variable X. Computing element 20 is adapted to determine from the random variable and the expectation the second bilateral moment or variance of the variable about its expectation. Element 22 is adapted to compute the denominator in the probability expression (9) above. Element 24 is adapted to compute P' based upon input information from elements 20 and 22.

The random variable signal $x$ is conducted from computer input terminal 12 over line 26 to input terminal 28 of computing element 18. The signal is applied to averaging circuit 30 of element 18. The averaging circuit performs a summation of the applied signal over a given time period to provide an output signal representing the expectation of the applied signal. Circuit 30 may be any conventional form of averaging circuit, such as a low pass filter or an operational amplifier with resistive-capacitive feedback. The output signal is coupled to output terminal 32 of element 18 and from this point over line 34 to input terminal 36 of computing element 20. The random variable signal is also conducted from terminal 12 over line 38 to input terminal 40 of computing element 20. The signals representing the variable and its expectation are applied to difference circuit 42. This circuit is operative to yield output signals representing instantaneous positive and negative disparities between the variable and its expectation. These signals are conducted to squaring circuit 44 which is adapted to provide output signals constituting the input signal raised to the second power.

The output of squaring circuit 44 is applied to averaging circuit 46. This circuit, like circuit 30 above, is operative to provide averaging of the applied signal over a selected period of time. This averaged signal is fed to output terminal 48 of element 22. The relationship of the circuitry just described to the theoretical computation of the second bilateral moment will be evident from a consideration of expression (1) above. It will be clear that element 20 constitutes means for determining the second bilateral moment of the variable as required in expression (9) above.

The computing element 22 has input terminals 50 and 52 to which are applied respectively the expectation $u$ over line 54 and the limit value Y over line 56. These signals are applied to difference circuit 58, whose operation is identical with that of circuit 42 discussed previously. The difference signals generated by circuit 58 are applied to squaring circuit 60 which is operative, as was circuit 44, to raise applied signals to the second power. These signals are conducted to output terminal 62 of computing element 22. It will be seen that this circuitry generates an output signal corresponding to that required in the denominator of expression (9) above. In operation of computing element 22 the absolute difference between Y and $u$ is computed and raised to the second power.

The signals appearing at terminals 48 and 62 of computing elements 20 and 22 are conducted over lines 64 and 66 to the input terminals 68 and 70 respectively of computing element 24. This element includes a division circuit 72 which is adapted to compute the ratio of the signal applied to terminal 68 to the signal applied to terminal 70. Circuit 72 may be a conventional division servomechanism or standard electronic divider. The ratio signal produced is conducted to output terminal 74 of computing element 24 whence it is led over line 76 to probability computer output terminal 16.

By reference to expression (9) above, it will be seen that computing element 24 operates to perform the required division of the quantities constituting the numerator and denominator in the expression, said quantities being previously computed by elements 20 and 22.

The probability computer of the invention is particularly useful in certain control applications, such as air pollution monitoring and control and manufacturing process control. In these applications, a variable such as smog or manufactured article length, mass, etc., is constantly monitored and compared with a fixed limit value identifying the allowable smog level or article characteristic level. The incorporation of the probability computer into such direct observation systems permits the additional advantage of evaluating the variable not only based upon its instantaneous value but further upon its probability of exceeding a limit value. Thus, anticipatory measures are provided which would permit, in the case of atmospheric pollution control, such measures as traffic diversion, or in the case of process control, the alteration of manufacturing parameters to permit continuous production. With this additional control measure, instantaneous departures above the predetermined limit values may be allowable if in the light of the probability computer analysis they are transient in nature and do not indicate a high probability of continuance.

The circuitry of FIG. 3 will indicate further the nature of air pollution or process control by the use of the probability computer. In FIG. 3 there is shown a positive difference circuit 100 having input terminals 102 and 104 and an output terminal 106. A signal indicative of a predetermined allowable probability of smog level deviation is applied to terminal 102. The measure of the probability of the variable deviating from its average value by an amount equaling or exceeding the difference between the prescribed limit level and the average value, said signal being computed by the computers of FIG. 2, is applied to terminal 104. Circuit 100 is operative to subtract the signal at terminal 104 from the signal at terminal 102 and to yield as an output signal at terminal 106 the instantaneous difference between allowed and actual probability. This signal is applied to an indicator 108 or may be directly utilizable in a feedback control loop in the manufacturing system. Indicator 108 may be a graduated scale indicator or an on-off indicator and serves to inform an observer of the approach of actual conditions to an undesirable level. As the undesirable point is reached, the operator may take suitable diversionary action to maintain a difference between the applied signals.

In certain cases it is desirable to employ both the additional measure of control provided by the probability computer as well as direct parameter observation as is customarily employed. Thus, there is illustrated in FIG. 3 a second circuit comprising a positive difference circuit 110 having input terminals 112 and 114 and an output terminal 116 connected to an indicator 118. The random variable is applied to terminal 112 and a signal representing the limit value is applied to terminal 114, these signals being likewise applied to the computer input terminals, e.g. 12 and 14. The difference circuit provides as its output signal a signal representing the instantaneous differences between the variable and the limit value. These signals are conducted to indicator 118 where a ready observation may be made of the progress of the variable in relation to its limit value. An operator may observe indicator 118 in conjunction with indicator 108 to implement traffic diversion or process control. For example, if he notes on indicator 118 that the variable has exceeded its prescribed limit value, he may, prior to any immediate action, consult indicator 108 to determine the present difference between the allowable probability and the probability determined by the associated computer. Where indicator 108 informs him that the determined probability is significantly below the allowed probability, the operator may ignore the indication of meter 118 as embodying only a transient departure of the parameter of interest beyond its prescribed limit.

The following is an example of the use of the probability computer in manufacturing process control. In this regard, consider an automated manufacturing process in which it is desired to accommodate maximum volume output while at the same time to produce articles within particular manufacturing tolerances. Frequently, in manufacturing processes, tolerance control of this type is in direct opposition to increased speed of operation. If article length is to be maintained within particular tolerances and the article stock is fed continuously to cutting apparatus, the ability of the apparatus to maintain article length within the tolerance may be related to the speed of article stock feeding. For expeditious manufacture, an evaluation is necessary wherein the probability of article length exceeding or equaling the required tolerance level is constantly determined and wherein adjustments to article feeding speed are based not only on instantaneous indications of article length but also on the probability evaluation.

In these applications of the present probability computer, the operation may take place either on an on-line basis, i.e. where the variable is applied directly to the computer for real-time analysis of the variable to determine probability bounds, or on an off-line basis. In the latter case, information concerning the variable may be accumulated over a period of time and stored for subsequent application to the probability computer.

Other suitable applications of the present probability computer are the monitoring of current and load conditions in electrical power distribution, the monitoring of pressure in fluid distribution systems, and the monitoring and control of heating and air conditioning systems. Temperature control in chemical processes where higher yield is achievable at higher temperatures is a further area in which the probability computer of the invention may be employed to provide the additional advantage and benefit of probability control as incorporated in the present invention.

It will be evident that various changes may be made in the disclosed embodiments of the probability computer without departing from the spirit and scope of the present invention. For instance, servomechanisms or like electromechanical means may be employed throughout where the application to which the computer is directed lends itself to such embodiments. In this connection it should be noted particularly that the term circuit is intended to describe purely electronic as well as partly electrical devices.

I claim:

1. A computer for determining a bound to the probability of the deviation of a variable from its average value equaling or exceeding the difference between a prescribed limit value and said average value, based on the second bilateral moment of said variable about said average value, said computer having a first input terminal for receiving a signal representing said variable, a second input terminal for receiving a signal representing said limit value and an output terminal for providing a signal representing said probability determination, said computer comprising:
   a. an averaging circuit for generating a signal representing said variable average value, having an input terminal connected to said computer first input terminal and having an output terminal;
   b. second bilateral moment determining means having first and second input terminals connected respectively to said computer first input terminal and said averaging circuit output terminal, and having an output terminal;
   c. difference circuit means for detecting the difference between said limit value signal and said variable average value signal having first and second input terminals connected respectively to said computer second input terminal and said averaging circuit output terminal, and having an output terminal; and
   d. division circuit means for producing a signal indicative of the ratio of the determined bilateral moment to the squared detected difference, having first and second input terminals connected respectively to said bilateral moment determining means output terminal and said difference circuit means output terminal, and having an output terminal connected to said computer output terminal.

2. The computer claimed in claim 1 wherein said second bilateral moment determining means comprises first means connected to said moment determining means input terminals and receiving said variable average value signal and said variable signal therefrom for producing an output signal indicative of the disparity between said signals, second means connected to said first means for squaring said first means output signal and third means connected to said second means for averaging said squared signal, said third means conducting said averaged squared signal to said moment determining means output terminal.

3. A computer for determining a bound to the probability of the deviation of a variable from its average value equaling or exceeding the difference between a prescribed limit value and said average value based on the second bilateral moment of said variable about said average value, said computer having a first input terminal for receiving a signal representing said variable, a second input terminal for receiving a signal representing said limit value and an output terminal for providing a signal representing said probability determination, said computer comprising:
   a. an averaging circuit for generating a signal representing said variable average value, having an input terminal connected to said computer first input terminal and having an output terminal;
   b. second bilateral moment determining means having first and second input terminals connected respectively to said computer first input terminal and said averaging circuit output terminal, and having an output terminal;
   c. difference circuit means for detecting the absolute difference between said limit value signal and said variable average value signal and for squaring said difference, having first and second input terminals connected respectively to said computer second input terminal and said averaging circuit output terminal, and having an output terminal; and
   d. division circuit means for producing a signal indicative of the ratio of the determined bilateral moments to said squared difference, having first and second input terminals connected respectively to said bilateral moment determining means output terminal and said difference circuit means output terminal and having an output terminal connected to said computer output terminal.

4. The computer claimed in claim 3 wherein said second bilateral moment determining means comprises first means connected to said moment determining means input terminals and receiving said variable average value signal and said variable signal therefrom for producing an output signal indicative of the disparity between said signals, second means connected to said first means for squaring said first means output signal and third means connected to said second means for averaging said squared signal, said third means conducting said averaged squared signal to said moment determining means output terminal.

5. A system for determining a bound to the probability of the deviation of a variable from its average value equaling or exceeding the difference between a prescribed limit value and said variable average value based on the second bilateral moment of said variable about its said average value, and for generating a control signal indicative of the difference between said probability determination and a predetermined allowable probability, comprising in combination, the computer claimed in claim 3, and a system difference circuit having a first input terminal connected to said computer output terminal, a second input terminal receiving a signal representing said predetermined allowable probability and an output terminal providing said control signal.

6. The system claimed in claim 5 including further an indicator connected to said system difference circuit output terminal, said indicator adapted to display the difference between said determined and allowable probabilities.

7. The system claimed in claim 6 including further means for concurrently indicating the difference between said variable and said limit value, said means comprising a second system difference circuit having first and second input terminals connected respectively to said computer first and second input terminals and having an output terminal, and second indicator means connected to said second system difference circuit output terminal, said second indicator adapted to display the difference between said variable and said limit value.

PO-1050
(5/69)

UNITED STATES PATENT OFFICE
CERTIFICATE OF CORRECTION

Patent No. __3,549,875__            Dated __December 22, 1970__

Inventor(s) __David A. Goldman__

It is certified that error appears in the above-identified patent and that said Letters Patent are hereby corrected as shown below:

Col. 2, line 10, the period should be deleted from the for
Col. 2, line 20, "=" (second instance) should read --+--.

Signed and sealed this 20th day of April 1971.

(SEAL)
Attest:

EDWARD M. FLETCHER, JR.                    WILLIAM E. SCHUYLER, J
Attesting Officer                          Commissioner of Patent